(12) United States Patent
Bassett et al.

(10) Patent No.: US 9,873,087 B2
(45) Date of Patent: Jan. 23, 2018

(54) REVERSE OSMOSIS WATER-ON-WATER CONTROL VALVE

(71) Applicant: 3M INNOVATIVE PROPERTIES COMPANY, St. Paul, MN (US)

(72) Inventors: Laurence W. Bassett, Killingworth, CT (US); Dian Zheng, Middlebury, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 877 days.

(21) Appl. No.: 14/038,000

(22) Filed: Sep. 26, 2013

(65) Prior Publication Data

US 2014/0102985 A1    Apr. 17, 2014

Related U.S. Application Data

(60) Provisional application No. 61/712,667, filed on Oct. 11, 2012.

(51) Int. Cl.
*B01D 61/12* (2006.01)
*B01D 61/06* (2006.01)
(Continued)

(52) U.S. Cl.
CPC ............ *B01D 61/12* (2013.01); *B01D 61/06* (2013.01); *B01D 61/10* (2013.01); *C02F 1/441* (2013.01); *F16K 11/07* (2013.01); *B01D 71/06* (2013.01); *B01D 2313/18* (2013.01); *C02F 1/001* (2013.01); *C02F 2201/005* (2013.01); *C02F 2209/03* (2013.01); *C02F 2209/40* (2013.01); *Y10T 137/2567* (2015.04)

(58) Field of Classification Search
CPC ........ B01D 61/12; B01D 61/06; B01D 61/10; B01D 71/06; B01D 2313/18; C02F 2209/03; C02F 1/001; C02F 2209/40; C02F 2201/005; Y10T 137/2567; F16K 11/07

See application file for complete search history.

(56) References Cited

U.S. PATENT DOCUMENTS 4,176,063 A    11/1979 Tyler
4,604,194 A  *  8/1986 Entingh ................. B01D 61/08
                                                                    210/137

(Continued)

FOREIGN PATENT DOCUMENTS

WO    WO 2011/043692    4/2011

OTHER PUBLICATIONS

U.S. Appl. No. 14/038,011, filed Sep. 26, 2013, entitled "Reverse Osmosis Water-On-Water Control Value".

*Primary Examiner* — Krishnan S Menon
*Assistant Examiner* — Waqaas Ali
(74) *Attorney, Agent, or Firm* — Scott A. Baum

(57) ABSTRACT

Described are water-on-water valves for use in reverse osmosis filtration systems. The water-on-water valves are regulated by the pressure in a product line, which contains fluid from a product line of the filter module and/or the product side of a water-on-water storage tank. Exemplary valves are shuttle valves that are regulated by the pressure downstream of the product side of a reverse osmosis filter module. The valves may comprise a piston within a housing, and an end of the piston may have an enlarged diameter relative to the maximum diameter of the remainder of the piston.

19 Claims, 5 Drawing Sheets

(51) Int. Cl.
  *C02F 1/44*    (2006.01)
  *F16K 11/07*   (2006.01)
  *B01D 61/10*   (2006.01)
  *B01D 71/06*   (2006.01)
  C02F 1/00      (2006.01)

(56) References Cited

U.S. PATENT DOCUMENTS

| | | |
|---|---|---|
| 4,623,467 A | 11/1986 | Hamlin |
| 4,629,568 A | 12/1986 | Ellis |
| 4,657,674 A | 4/1987 | Burrows |
| 4,705,625 A * | 11/1987 | Hart, Jr. ............... B01D 61/08 210/110 |
| 4,808,302 A | 2/1989 | Beall, Jr. |
| 4,885,085 A | 12/1989 | Beall, Jr. |
| 4,909,934 A | 3/1990 | Brown |
| 5,341,834 A | 8/1994 | Doherty |
| 5,662,793 A | 9/1997 | Beall, Jr. |
| 6,110,360 A | 8/2000 | Hart, Jr. |
| 6,368,503 B1 | 4/2002 | Williamson |
| 8,257,594 B2 | 9/2012 | Astle |
| 2004/0164022 A1 | 8/2004 | Solomon |
| 2005/0023198 A1 | 2/2005 | Halemba |
| 2009/0200238 A1 | 8/2009 | Astel |
| 2010/0116724 A1* | 5/2010 | Schmitt ............... B01D 61/08 210/136 |

* cited by examiner

REVERSE OSMOSIS WATER-ON-WATER CONTROL VALVE

CROSS REFERENCES TO RELATED APPLICATIONS

This application claims priority to U.S. Provisional Application 61/712,667, filed Oct. 11, 2012, the contents of which are incorporated by reference.

TECHNICAL FIELD

Embodiments of the present invention generally relate to filtration systems, in particular water-on-water control valves and reverse osmosis systems including such valves.

BACKGROUND

Various water filtration systems designed for residential and commercial use have become increasingly popular for the removal of unwanted substances from input water. Filtration systems utilize a filter module such as a reverse osmosis filter module to provide filtered output water for consumption or other use.

Two common water filtration systems are air-on-water systems that discharge product water into an enclosed pressure vessel against back pressure created by an air compartment within the vessel, and water-on-water systems that discharge product water into an enclosed pressure vessel and into a flexible water compartment that can be compressed by a separate source of water to remove the product water from the vessel.

In air-on-water systems, the water storage tank is divided into two compartments. The first compartment is for holding product water and the second compartment is filled with a pre-charge of air. As the filtration system produces water and fills the storage tank, the air compartment is compressed to accommodate the volume of product water introduced into the product compartment, which increases the air pressure. That increase in air pressure continues to rise for every ounce of product water forced into the storage tank. As such, air-on-water systems are subject to the back pressure of the air compartment, which causes the pressure differential across the filtering portion of the system to be reduced. This reduction in pressure differential thereby reduces the quality and quantity of filtered product water made in a given time. Product water quality particularly suffers if the product water is frequently drawn off and replaced in small quantities, as typically occurs in household systems. Moreover, an air-on-water system does not provide a constant flow rate of product water because the air compartment gradually loses pressure as the air compartment-propelled water is emptied from the storage vessel.

Water-on-water systems can address many of the shortcomings of air-on-water systems. Water-on-water systems typically include a pressure vessel containing two water-filled compartments. Often, a first compartment stores product water and a second compartment contains "squeeze" water. A physical separation between the compartments is movable or flexible so that water pressure in the first compartment is influenced by the water pressure in the second compartment. Thus, pressure from the "squeeze" side can discharge water from the product side to a faucet or other outlet downstream when there is a water demand. The physical separation between the compartments can be a membrane or other similar structure. In these water-on-water systems, there is only a small amount of backpressure acting upon the membrane, which is the amount of pressure required to force water from the squeeze compartment to the drain as the product compartment is filled.

There is a continuing need for improved water-on-water valves and filtration systems using such valves.

SUMMARY

One aspect of the present invention pertains to a filtration system comprising a water-on-water storage tank comprising a squeeze side and a product side separated by a membrane; a filter module in fluid communication with the water-on-water storage tank, a feed source, a product outlet, and a drain outlet; a feed line connecting the feed source to a feed inlet of the filter module; a product line connecting a filtrate outlet of the filter module to the product side of the storage tank and the product outlet; and a drain line connecting a reject outlet of the filter module to the squeeze side of the storage tank and the drain outlet of the system; and a valve or a combination of valves that regulates the flow from the feed source, wherein pressure in the product line determines the state of the valve or the combination of valves.

In one or more embodiments, the valve or the combination of valves has at least three states, wherein: the first state enables flow from the feed source to the filter module and from a reject outlet of the filter module to the squeeze side of the storage tank when there is flow through the product outlet, the second state enables flow from the feed source to the filter module and from the squeeze side of the storage tank to the drain outlet of the system when there is not flow through the product outlet and the product side is not full, and the third state blocks flow from the feed source into the filtration system when the product side is full.

The filter module may comprise a reverse osmosis filter. In one or more embodiments, the filter module also comprises one or more pre-filters upstream of the reverse osmosis filter. In some embodiments, the filter module comprises a post-filter downstream from the product side of the storage tank.

The filtration system may also comprise one or more check valves, such as a check valve downstream from a filtrate outlet of the filter module that prevents fluid flow into the filtrate outlet of the filter module. Another check valve may be placed downstream from the product side and upstream of the valve or the combination of valves to maintain a hold pressure during the third state.

In one or more embodiments, the filtration system may comprise a flow control regulator that regulates flow from a reject outlet of the filter module to the drain outlet of the system when the valve is in the first state.

One or more embodiments provide that the valve comprises a shuttle valve or a multiport valve. If the valve is a shuttle valve, in some embodiments, an end portion of the shuttle valve is in communication with the pressure downstream of the product side. If the valve is a multiport valve, in some embodiments, a controller for the multiport valve is in communication with the pressure downstream of the product side.

Other embodiments provide that the system is regulated by a combination of valves. In these embodiments, the combination of valves may comprise a plurality of valves and a controller. Some embodiments provide that the controller is in communication with the pressure downstream of the product side.

Another aspect of the present invention relates to a reverse osmosis water-on-water valve comprising a valve feed inlet port, a valve feed outlet port, a drain port, a reject port, and a tank squeeze port. In embodiments of this aspect, the valve has at least three states, wherein in the first state, a first fluid path is defined by the valve feed inlet port that is in fluid communication with the valve feed outlet port, and a second fluid path is defined by the reject port that is in fluid communication with the tank squeeze port; in the second state, a third fluid path is defined by the valve feed inlet port that is in fluid communication with the valve feed outlet port, and a fourth fluid path is defined by the tank squeeze port that is in fluid communication with the drain port; and in the third state, the valve feed inlet port is not in fluid communication with the valve feed outlet port.

In some embodiments, the valve may be a solenoid-controlled multiport valve or a combination of solenoid-controlled valves.

In some embodiments, the valve may be a shuttle valve. The shuttle valve may comprise a piston body in a housing, the piston body having a first end potion connected to a spring. Some embodiments provide that the pressure on a second end portion of the piston body determines whether the valve is in the first, second, or third state.

In one or more embodiments, the piston body further comprises a piston face at the second end portion of the piston body, wherein a diameter of the piston face is greater than a maximum diameter of the piston body. The piston body may comprise a plurality of sections, with a first group of sections each independently having a first diameter effective to block flow from or to one or more of the following: the valve feed inlet port, the valve feed outlet port, the drain port, the reject port, and the tank squeeze port depending on the state of the valve, and a second group of sections each independently having a reduced diameter with respect to one or more of the first diameters, effective to permit flow from or to one or more of the following: the valve feed inlet port, the valve feed outlet port, the drain port, the reject port, and the tank squeeze port depending on the state of the valve. The first group of sections may be arranged in an alternating arrangement with the second group of sections.

The piston body may also comprise a flow slot to allow fluid communication between the valve feed inlet port and the valve feed outlet port as the valve moves from the third state to the first state.

In some embodiments, the housing includes one or more vents through the housing to allow air to be vented as the piston body moves between states. The one or more vents may be on the first end of the piston, second end of the piston, or both.

The housing may also comprise a chamber in fluid communication with the second end portion of the piston body, wherein changes in pressure in the chamber cause the piston to move. The chamber may comprise therein an inlet check valve and an outlet check valve, wherein the inlet check valve has a cracking pressure greater than a cracking pressure of the outlet check valve.

The valve may also comprise a plurality of sealing devices which separate fluid paths during the various states. In some embodiments, the sealing devices are effective to separate the first fluid path from the second fluid path during the first state and are effective to separate the third fluid path from the fourth fluid path during the second state.

A valve in accordance with this aspect or any embodiments described herein may be utilized in a filtration system. Such a filtration system may comprise a water-on-water storage tank comprising a squeeze side and a product side separated by a membrane; a filter module connected to a feed source by a feed line, to a product outlet by a product line, and to a drain outlet by a drain line; and the valve. In some embodiments, the pressure of the product line may determine the state of the valve. A check valve may be located in the product line to maintain a hold pressure on the valve during the third state.

Another aspect of the present invention relates to a method of providing filtered water with a filtration system. In embodiments of this aspect, the method comprises introducing feed water into a valve or a combination of valves, delivering the feed water from the valve to a filter module, filtering the feed water with the filter module to provide filtered water and reject water, storing filtered water in a water-on-water storage tank, dispensing filtered water from the water-on-water storage tank to a product outlet through a product line, and discarding reject water through a drain outlet. In some embodiments, the pressure in the product line determines the state of the valve or the combination of valves.

In one or more embodiments, the valve comprises: a valve feed inlet port, a valve feed outlet port, a drain port, a reject port, and a tank squeeze port. The valve may have at least three states, wherein: in the first state, a first fluid path is defined by the valve feed inlet port that is in fluid communication with the valve feed outlet port, and a second fluid path is defined by the reject port that is in fluid communication with the tank squeeze port; in the second state, a third fluid path is defined by the valve feed inlet port that is in fluid communication with the valve feed outlet port, and a fourth fluid path is defined by the tank squeeze port that is in fluid communication with the drain port; and in the third state, the valve feed inlet port is not in fluid communication with the valve feed outlet port. In some embodiments, the valve comprises a shuttle valve.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Figure 1:
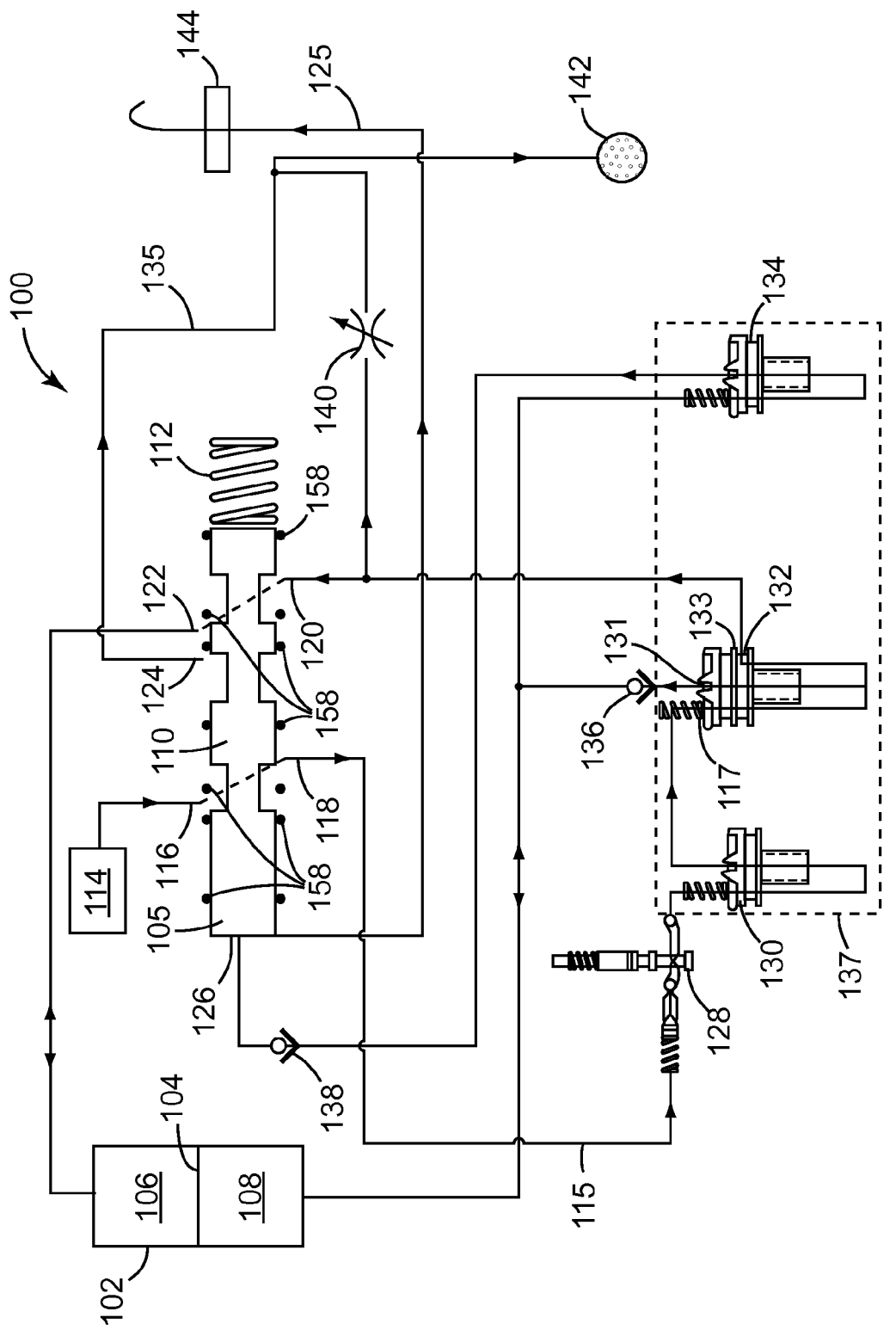
FIG. 1 is a schematic of a reverse osmosis filtration system in accordance with one or more embodiments of the invention.

Provided are water-on-water control valves for use in reverse osmosis or other filtration systems. In various embodiments, the water-on-water valves are regulated by the pressure in the product line, which contains fluid from a product line of the filter module and/or the product side of a water-on-water storage tank. In some embodiments, use of the product line pressure instead of the reject line pressure may reduce valve chatter with low demand flow rates. Use of product line pressure may also reduce the likelihood that the valve will stall in the transition state.

Current water-on-water systems still have certain disadvantages. The control valve of the system may stall or freeze if another water demand occurs when the valve is in a transition state. After stalling, there may be a long time delay before the valve can self-recover and begin water production. Valve chatter may also occur if there is a very low demand flow rate, such as from an ice maker. Furthermore, the initial startup procedure may be difficult because the water-on-water storage tank needs to be purged of air before the valve can operate. Startup may require filling the product compartment, followed by filling the squeeze compartment, then filling the product compartment again. It has unexpectedly been found that use of pressure in the product line to regulate the state or configuration of the control valve addresses certain disadvantages of current water-on-water systems.

Although specific reference is made to reverse osmosis filtration systems, the water-on-water valves and systems described herein may be used with other similar fluid filtration systems.

As used herein, a tensioner or spring refers to any component that provides a tension or compression force that pulls or pushes on another component. In some embodiments, the tensioner or spring is a conventional spring that applies a force dependent on the displacement of the spring. Types of springs include, but are not limited to, cantilever springs, helical springs, balance springs, leaf springs, V-springs, Belleville springs, gas springs, compression springs, extension springs, torsion springs and constant force springs.

As used herein, a filter module refers to one or more filtration members or filter elements that remove impurities or other undesirable substance from a fluid. The filter module may consist of a single filter element, or may comprise a plurality of filtering elements. In one or more embodiments, the filter module comprises a reverse osmosis filter element. In various embodiments, the filter module includes additional filter elements such as pre-filters, post-filters or additional reverse osmosis filter elements.

As used herein, a pressure fuse refers to a component that regulates the pressure downstream from the fuse such that the downstream pressure does not exceed a trip pressure. The term pressure fuse is a general term that encompasses both resettable and non-resettable devices. Suitable pressure fuses are described in co-owned U.S. Patent App. No. 61/667,103, filed Jul. 2, 2012, which is herein incorporated by reference in its entirety.

Figure 5:
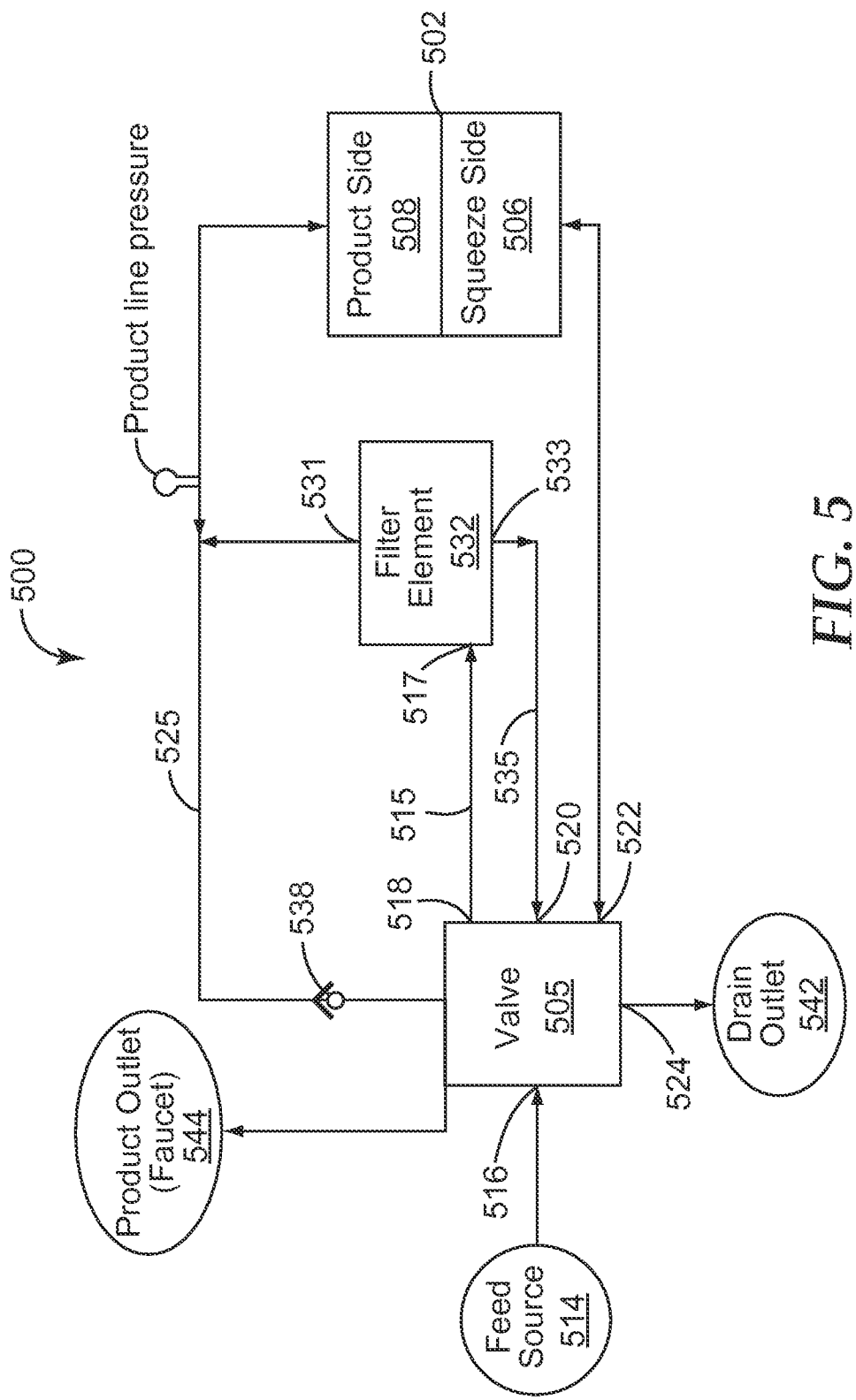
FIG. 5 is a schematic drawing of an exemplary system.

One aspect provided herein relates to a filtration system for filtering fluid or water from a feed source to provide an output of product water. In FIG. 5, general filtration system 500 is shown. A valve or combination of valves 505 controls flow from one or more inputs to one or more outputs. Also part of the system are a filter element 532 and a water-on-water storage tank 502. The filter element 532 has a filtrate outlet 531 from which filtered fluid or water exits as product fluid or water and a reject outlet 533 from which reject fluid or water flows. The water-on-water storage tank 502 has a product side or compartment 508 that can receive the product fluid or water and a squeeze side or compartment 506 that can receive reject fluid or water. Flow paths are based on pressure in the product line 525 wherein the valve or combination of valves enters a particular state that enables a particular flow path. Flows paths can be as follows. A first flow path in the first state is defined by a valve feed inlet port 516 that is in fluid communication with a valve feed outlet port 518, and a second fluid path is defined by a reject port 520 that is in fluid communication with a tank squeeze port 522. In a second state, a third fluid path is defined by the valve feed inlet port 516 that is in fluid communication with the valve feed outlet port 518, and a fourth fluid path is defined by the tank squeeze port 522 that is in fluid communication with a drain port 524. In a third state, the valve feed inlet port 516 is not in fluid communication with the valve feed outlet port 518. A filter module can be one or more structures that purify a fluid such as water, where the purified fluid or output water exits from the system through a filtrate outlet 531. For example, the filter module may include the filter element 532, pre-filters prior to the filter element and/or post-filters after the filter element. The filter element 532 receives feed source fluid or water to be filtered through feed line 515 and feed inlet 517. Filtrate or product fluid or water exits the filter element through the filtrate outlet 531 and through product line 525 to the product side 508 and/or the product outlet 544. Reject fluid or water exits the filter element through reject outlet 533 and travels through drain line 535 to the drain outlet 542 or the squeeze side 506. Product line 525 can be in contact with the valve 505 for hydraulically-operated valves and for mechanical valves, such contact is not necessary. A check valve 538 is in communication with the valve 505, and it maintains a hold pressure when the product compartment is full to keep the valve 505 in position for a particular state, such as a recovery state and a rest state.

FIG. 1 shows a detailed exemplary filtration system 100 in accordance with one or more embodiments. Filtration system 100 includes a water-on-water storage tank 102, a control valve 105 and a filter element 132. Storage tank 102 includes a first compartment 108 for storing product water and a second compartment 106 for storing squeeze water. A divider 104 separates the storage tank 102 into the product and squeeze sides or compartments. The divider 104 may be a membrane, bag, diaphragm or other similar structure for physically separating the product side from the squeeze side, but allowing the pressure from the squeeze compartment 106 to act upon the fluid in the product compartment 108. Likewise, pressure from the product compartment 108 acts upon the squeeze compartment 106.

The filter element 132 is in fluid communication with a feed source 114, a drain outlet 142 and a product outlet, such as a faucet, 144. Through the filter element 132, the filtration system 100 filters fluid from feed source 114 to provide an output of product water to product outlet 144, with remaining reject water flowing to drain outlet 142. For example, if filter element 132 is a reverse osmosis filter element, then the product water exiting the filtrate outlet 131 of the filter element 132 will have a lower solids or impurities content than the fluid from feed source 114, and the reject water will have a higher concentration of solids or impurities than the feed source fluid. Accordingly, the reject water that exits through the reject outlet 133 of filter element 132 is a byproduct of the reverse osmosis process and is disposed of through drain outlet 142. The filtrate outlet 131 of filter element 132 may be in fluid communication with a check valve 136 to protect against backpressure on the filter element 132.

The filtration system may also include a feed line 115 connecting the feed source 114 to the feed inlet 117 of the filter element 132, a product line 125 connecting the filtrate outlet 131 of the filter element 132 to the product compartment 108 of the storage tank 102 and the product outlet 144 of the system, and a drain line 135 connecting the reject outlet 133 of the filter element 132 to the squeeze compartment 106 of the storage tank 102 and the drain outlet 142 of the system.

The feed line 115 may also fluidly connect a pressure fuse 128 and one or more pre-filters 130 to the feed inlet of the filter element 132. Pressure fuse 128 may be a device that ensures the pressure downstream of the pressure fuse 128 does not exceed a threshold value by acting as a "fuse". When the pressure at the pressure fuse 128 reaches or exceeds the threshold value, the pressure fuse 128 will trip and prevent components downstream of the pressure fuse 128 from being exposed to the pressure increase. In this way, the pressure fuse 128 operates similarly to an electrical fuse or circuit breaker. The pressure fuse may be resettable or non-resettable, depending on the use. The filter element 132 may be part of a filter module 137 which may include additional components, such as a pre-filter 130 or a post-filter 134. The pre-filter 130 may filter the fluid before it reaches the primary filter element 132.

A post-filter 134 may be placed in the product line 125 to be a polishing filter before delivering the water to the product outlet 144. The post-filter 134 may be downstream of both the product side of the filter element 132 and the product compartment 108.

A valve or combination of valves 105 controls the flow of fluid into the system and to the various components of filtration system 100. The valve 105 may be a shuttle valve comprising a piston body 110, a spring 112 and a plurality of ports 116, 118, 120, 122 and 124. The arrangement and connectivity of the ports 116, 118, 120, 122 and 124 can be varied to provide numerous potential configurations for regulating the fluid flow through the filtration system 100. More or fewer ports may be utilized. In one or more embodiments, port 116 may be a valve feed inlet port to receive fluid from feed source 114, port 118 may be a valve feed outlet port to provide feed source fluid to the filter element 132, port 120 may be a reject port to receive reject water from the filter element 132, port 122 may be a tank squeeze port to send fluid to and receive fluid from the squeeze compartment 106, and port 124 may be a drain port to provide reject water to the drain outlet 142. Alternatively, instead of using a single multi-port valve, a combination of valves each having at least one inlet port and at least one outlet port may be used. Those skilled in the art will recognize that many potential configurations of valves may be used to provide the desired regulation of fluid flow through the filtration system.

One or more O-rings 158 may separate fluid flows through the valve 105 to prevent mixing of fluid streams, as well as prevent water leakage out of the valve.

The control valve 105 may have a plurality of states that each provides different flows through the system. According to one or more embodiments, the state of the control valve 105 is determined by a pressure downstream of the product compartment 108. For example, the pressure in the product line 125 at the end potion 126 of the piston body 110 may determine the state of the control valve 105.

The control valve or combination of valves 105 may be hydraulically controlled by the fluid pressure, or may be electromechanically controlled. Examples of suitable hydraulic valves include shuttle valves. Examples of valves suitable for electromechanical control include solenoid controlled valves, ball valves, spherical valves and plug valves. In embodiments that the control valve(s) are electromechanically controlled, a control system may control the state of the valve(s) 105 through the use of one or more solenoids or electric motors. The control system may be in communication with pressure sensors or flow sensors located throughout the filtration system. The control system may use these pressure or flow sensors to determine when there is a water demand and adjust the state of the control valve(s) 105 accordingly. For example, if a pressure sensor measures a drop in the pressure of product line 125, the control system may shift the valve 105 from the rest state to the dispensing state. Thus, even if a control system is used to control the state of the valve 105, the valve state may indirectly be determined by the pressure or flow in the product line 125.

The plurality of states can be referred to as at rest, dispensing, and recovery. In FIG. 1, the configuration shown is "dispensing," where when there is a water demand, such as from a drinking faucet or ice maker, from product outlet 144, a hold pressure on end portion 126 is reduced to about 0 psig and spring 112 extends to its full length. In this state, the control valve 105 enables flow from the feed source 114 into the valve feed inlet port 116 and out of valve feet outlet port 118. The control valve 105 also permits fluid communication between the reject outlet 133 of the filter element 132 through reject port 120 and the squeeze compartment 106 of the storage tank 102 through tank squeeze port 122. There is no fluid communication through drain port 124 during the dispensing state. The feed water travels down the length of a scroll of the filter element 132 (sometimes referred to as "fast flush") before entering the tank squeeze port 122 in the valve 105 and then to the squeeze compartment 106 of the tank.

As the reject water enters the squeeze compartment 106, water is forced out of the product compartment 108. At this point, the pressure at the bottom of the product compartment 108 will be equal to the pressure drop through the post-filter 134, the resistance in the downstream lines and any flow control in the faucet or other product outlet 144. The reject water may flow through a flow control regulator 140 that regulates the flow to the drain outlet 142.

When the water demand ends, the control valve 105 continues to allow fluid from the feed source 114 into the system. The filter element 132 continues to produce product fluid, and the pressure in the product line 125 and product compartment 108 will rise. Once a certain pressure is reached, the control valve 105 may shift to a "recovery" state. According to one or more embodiments, this shift occurs due to the pressure at the end portion 126 overcoming the force of the spring 112.

In the recovery state, the control valve 105 maintains fluid communication from the feed source 114 into the filtration system. The control valve 105 also places the squeeze compartment 106 through tank squeeze port 122 in fluid communication with the drain outlet 142 through drain port 124. Once the squeeze compartment 106 is connected to the drain outlet 142, the back pressure of the storage tank 102 approaches 0 psi. However, a check valve 138 near the end portion 126 of the control valve 105 maintains a hold pressure obtained when the product compartment was full to keep the control valve 105 in position for the recovery state and the rest state as discussed below. The filter element 132 continues to make product water and fill the product compartment 108, which forces squeeze water out of the squeeze compartment 106 of the storage tank 102. Because the squeeze compartment 106 of the tank is open to drain in the recovery state, the back pressure on the divider 102 is only that required to force the water out of the squeeze compartment 106 to the drain outlet 142.

At the same time the filter element 132 is filling the product compartment 108 of the storage tank 102 with product water, the reject water is being force through a flow control regulator 140 that applies the pressure required for reverse osmosis. This continues until the product compartment 108 is full.

When the product compartment 108 is full and the feed source is still entering into the system, the filter element 132 will continue to filter water. Because there is no outlet for the product water, pressure will rise in the system and in the product line 125 adjacent the end portion 126. When the pressure reaches the pressure for the "at rest" state, (such as about 25 psig), the valve 105 will move to compress the spring 112 (to the right of FIG. 1) and the feed source passage will be shut off. Pressure will over time relieve to 0 psig through the flow control regulator 140 and once the pressure drops below the osmotic pressure the filter element 132 will no longer make product water. This will shut off the system until the next water demand.

During the time after recovery and until the next water demand, the control valve is "at rest". In this state, the product compartment 108 of the storage tank 102 is filled with fluid, and the control valve 105 prevents flow from the feed source 114 into the filtration system 100. In this state, the storage tank 102, post filter 134 and the end portion 126 of the control valve 105 may be at about the same pressure. This pressure may be varied depending on the design of the control valve, but in some embodiments may be in the range from about 10 psig to about 50 psig. In some embodiments, the pressure at the end portion 126 is in the range from about 20 psig to about 30 psig, such as about 25 psig. This pressure against the end portion 126 of the control valve 105 holds the valve in the at rest position against the force of the spring 112. The squeeze compartment 106 of the tank and the reject line from the filter element 132 may be open to the drain outlet 142. The pre-filter 130 and filter module 132 may be at about 0 psig because both components are isolated from feed water pressure and water hammer events.

Another aspect herein pertains to a control valve that may be used in a reverse osmosis filtration system. This control valve may be used in a filtration system as described above. In one or more embodiments of this aspect, the valve comprises a piston body in a housing, and the piston body has a first end potion connected to a spring. The valve also has a feed inlet port, a feed outlet port, a drain port, a reject port, and a tank squeeze port. The valve also has a plurality of states that define different fluid paths between the ports.

In the first state, which may be a "dispensing" state, a first fluid path is defined by the valve feed inlet port that is in fluid communication with the valve feed outlet port, and a second fluid path is defined by the reject port that is in fluid communication with the tank squeeze port. In the second state, which may be a "recovery" state, a third fluid path is defined by the valve feed inlet port that is in fluid communication with the valve feed outlet port, and a fourth fluid path is defined by the tank squeeze port that is in fluid communication with the drain port. The third fluid path of the second state may be the same as the first fluid path in the first state, or the two fluid paths may be different. In the third state, which may be an "at rest" state, the valve feed inlet port is not in fluid communication with the valve feed outlet port. In one or more embodiments, the O-rings and/or the shape of the piston body is effective to separate the first fluid path from the second fluid path in the first state, and during the second state, is effective to separate the third fluid path from the fourth fluid path.

Figure 2:
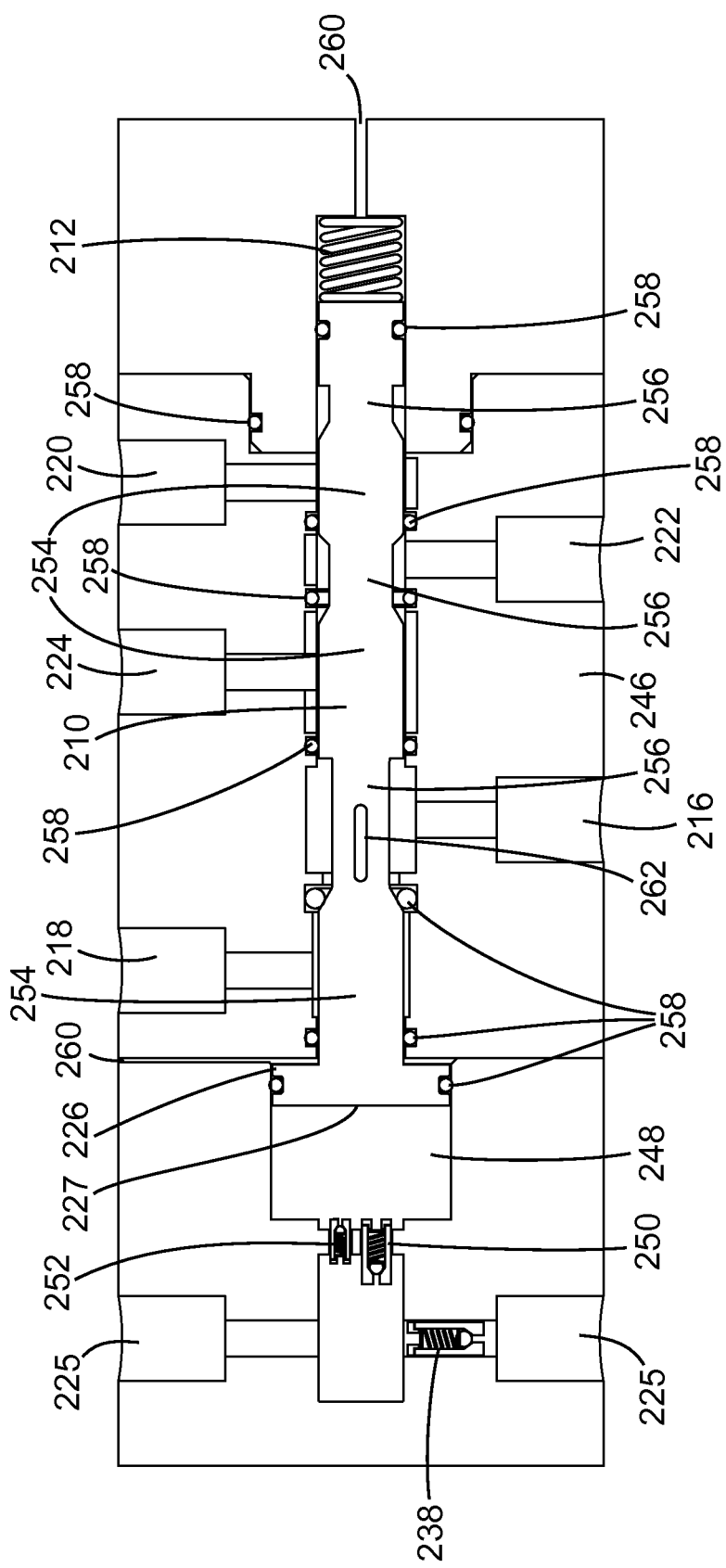
FIGS. 2-4 are cross-section views of a shuttle valve in three different states in accordance with one or more embodiments of the invention.

An exemplary embodiment of a control valve in the rest state is shown in FIG. 2. The valve 205 shown in FIG. 2 has a piston body 210 in a housing 246. The configuration of the ports 216, 218, 220, 222 and 224 of control valve 205 in FIG. 2 is an alternate configuration of the ports 116, 118, 120, 122 and 124 of the control valve 105 in FIG. 1. A spring 212 acts upon a first end of the piston body. A second end of the piston body 226 may have a piston face 227. The force of the spring 212 acts against the force provided by the pressure at the piston face 227. In one or more embodiments, the diameter of the piston face 227 is greater than the maximum diameter of the remaining piston body 210. If the piston face 227 has an enlarged diameter relative to the remaining piston body 210, the friction force on the piston body 210 is relatively low compared to the force from the pressure at the piston face 227. Use of an enlarged-diameter piston face 227 also allows the use of a stiffer spring 212. In one or more embodiments, the piston face has a diameter in the range from 0.25 inches to 2.5 inches (that is, the diameter size can include, but is not limited to: 0.25, 0.5, 0.75, 1.0, 1.25, 1.5, 1.75, 2.0, 2.25, or even 2.50 inches) or has a surface area in the range from 0.05 square inches to 5 square inches (that is, the surface area can be, but is not limited to: 0.05, 0.2, 0.4, 0.8, 1.2, 1.8, 2.4, 3.1, 4.0, or even 4.9 square inches). Also, in one or more embodiments, the spring has a spring rate in the range from 10 pounds per inch to 60 pounds per inch (that is, the spring rate can be 10, 15, 20, 25, 30, 35, 40, 45, 50, 55, or even 60 psi).

The second end 226 may be enclosed in a chamber 248. The chamber 248 may comprise an inlet check valve 250 and an outlet check valve 252. The chamber may be in fluid communication with a product line 225 (corresponding to product line 125 in FIG. 1) that carries filtered fluid from a filtrate outlet of a filter module to a product outlet such as a faucet. In some embodiments, the inlet check valve 250 has a cracking pressure greater than a cracking pressure of the outlet check valve 252. A "strong" inlet check valve 250 may create a more dynamic pressure introduction to the valve to help overcome O-ring static friction. Also, a "weak" outlet check valve 252 paired with the strong inlet check valve 252 may allow substantially all of the water to flow out of the chamber 248, and thus the piston 210 may move freely when there is a water demand and the system needs to respond. A check valve 238 (corresponding to check valve 138 in FIG. 1) may also help capture pressure downstream of the check valve 238 to maintain the control valve in a particular state. In one or more embodiments, check valve 238 may have a cracking pressure in the range from 0 to 0.5 psi, check valve 250 may have a cracking pressure in the range from 20 to 60 psi and check valve 252 may have a cracking pressure in the range from 0 to 5 psi.

The housing may have a valve feed inlet port 216, a valve feed outlet port 218, a reject port 220, a tank squeeze port 222 and a drain port 224. The piston body 210 may have a plurality of sections comprising a first group of sections 254 and a second group of sections 256. The first group of sections 254 may each independently have a first diameter effective to block flow from or to one or more of the following: the valve feed inlet port 216, the valve feed outlet port 218, the reject port 220, the tank squeeze port 222, and the drain port 224, depending on the state of the valve. The second group of sections 256 may each independently have a reduced diameter with respect to one or more of the first diameters of the first group of sections 254, with the reduced diameters effective to permit flow from or to one or more of the following: the valve feed inlet port 216, the valve feed outlet port 218, the reject port 220, the tank squeeze port 222, and the drain port 224, depending on the state of the valve. One or more sealing devices 258 may also block flow between two or more ports, or prevent flow out of the housing 246. The sealing devices may be O-rings, gaskets and the like. The housing may also include one or more vents 260 to allow for air venting as the control valve moves between states.

As shown in FIG. 2, the rest state of the control valve may block fluid flow from the feed inlet port 216 to the feed outlet port 218. A portion 254 and O-ring 258 may provide a tight seal so that the fluid flow is prevented between these ports. The configuration of the feed inlet port 216 and feed outlet port 218 shown in FIG. 2 allows the feed pressure to press the O-ring tightly against the seal. The rest state may also allow fluid to flow from the tank squeeze port 222 to the drain port 224.

Figure 3:
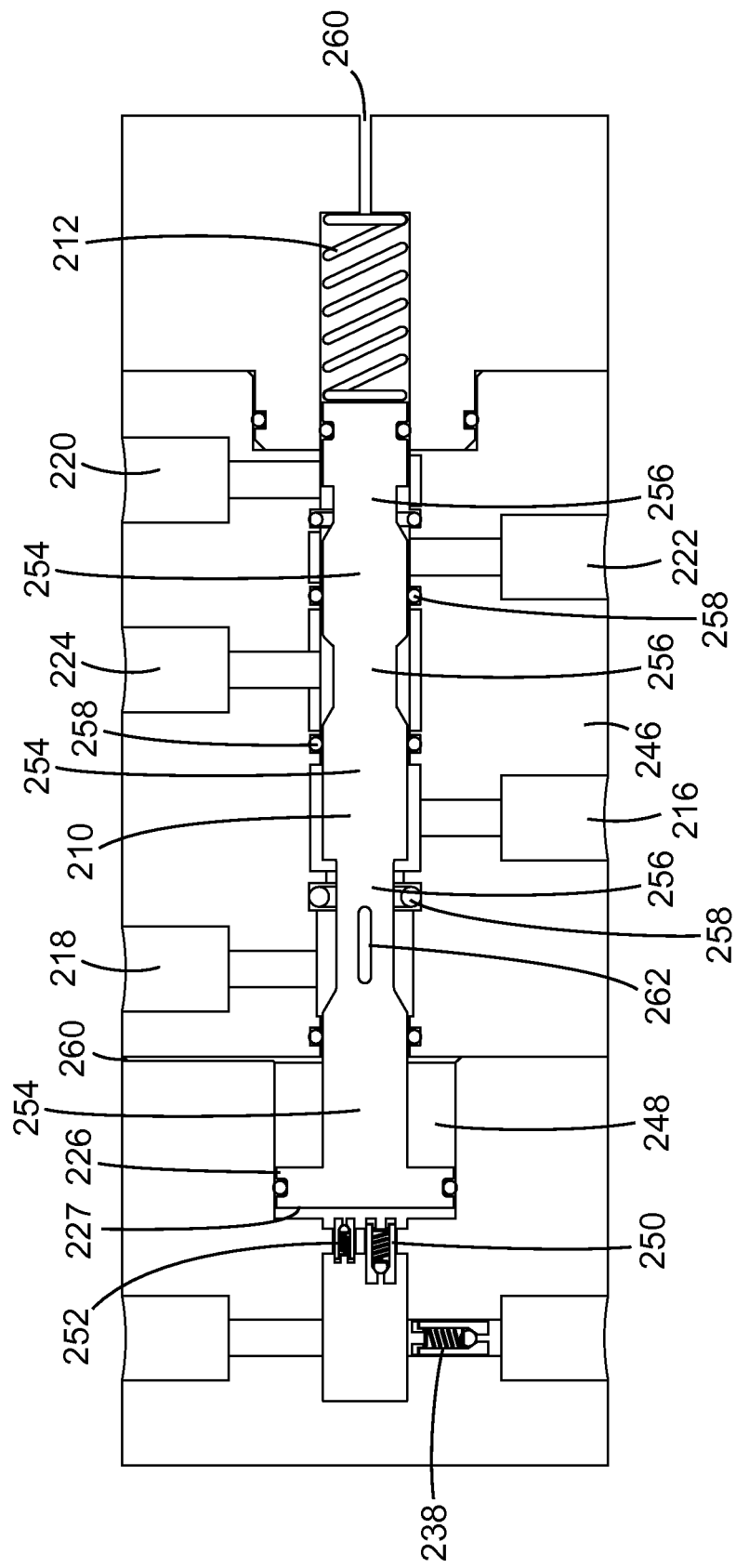

FIG. 3 shows an exemplary control valve in the dispensing state. The feed inlet port 216 is in fluid communication with the feed outlet port 218, and the reject port 220 is in fluid communication with the tank squeeze port 222. The valve may be in this state when there is a water demand, and thus enable fluid flow from a product compartment and to a product outlet.

As the valve transitions from the rest state to the dispensing state, the O-ring 258 between the feed inlet port 216 and the feed outlet port 218 may grab the piston body 210, thus preventing piston movement and thereby preventing flow communication across the O-ring 258. Accordingly, in some embodiments, the piston body includes a flow slot 262 or other groove to allow communication as soon as the piston moves any distance. Such a flow slot 262 can therefore assist in allowing the valve to turn on and move to the dispensing state.

Figure 4:
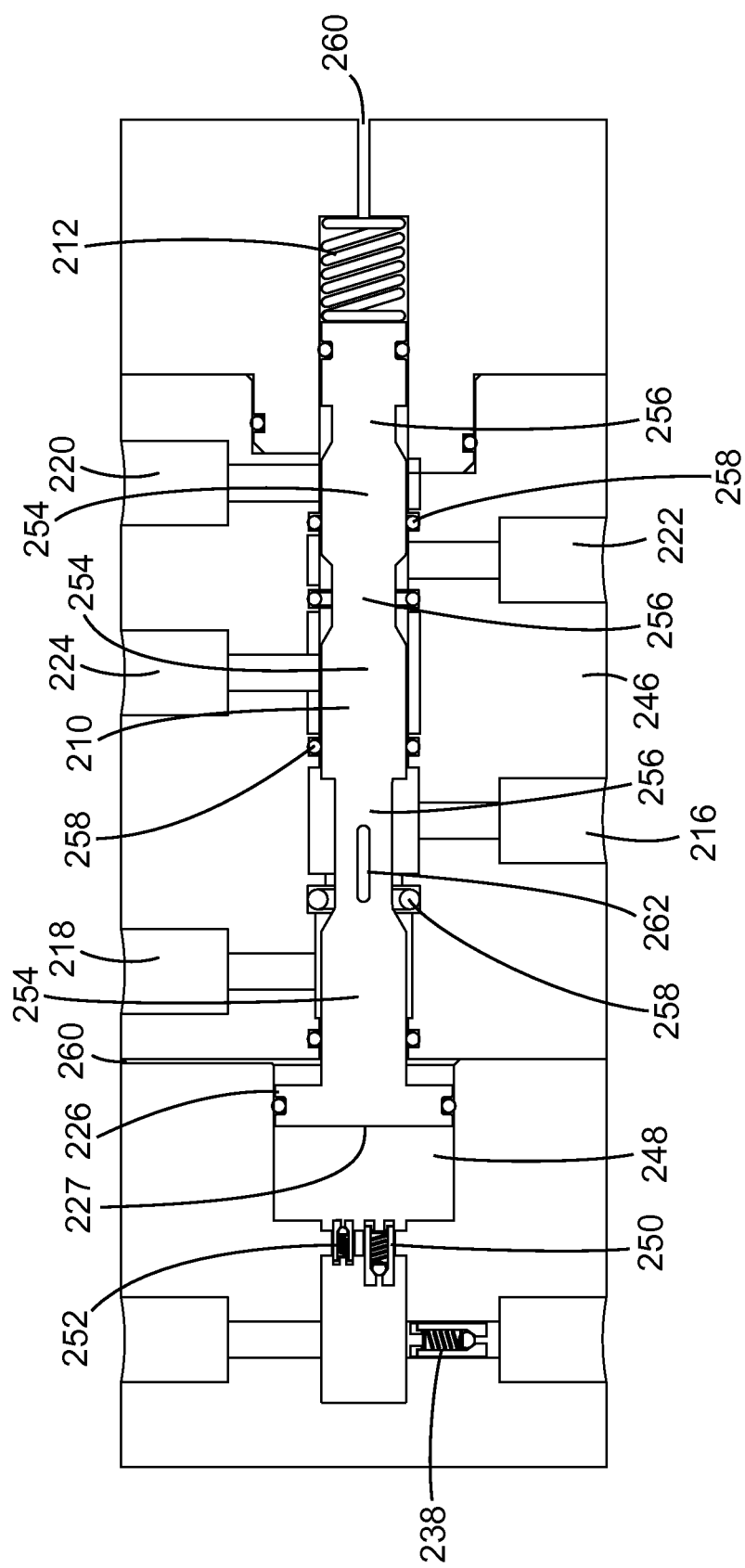

FIG. 4 shows a control valve in the recovery state. In this state, the feed inlet port 216 is in fluid communication with the feed outlet port 218, and the tank squeeze port 222 is in fluid communication with the drain port 224. The control valve may be in this state once there is no longer a water demand, and a storage tank is filled with product water from a reverse osmosis filtration module. Once the storage tank is full, the resulting increase in pressure at the piston face 227 moves the valve from the recovery state to the rest state.

Another aspect pertains to a method of providing filtered water with a filtration system. The method may comprise any of the steps described herein. In one or more embodiments of this aspect, the method comprises introducing feed water into a valve, delivering the feed water from the valve to a filter module, filtering the feed water with the filter module to provide filtered water and reject water, storing filtered water in a water-on-water storage tank, dispensing filtered water from the storage tank to a product outlet of the system, and discarding reject water through a drain outlet of the system.

The valve may have any of the features of a control valve described above. In one or more embodiments, the valve comprises a valve feed inlet port, a valve feed outlet port, a drain port, a reject port, and a tank squeeze port. The valve may have a plurality of states that regulate fluid flow through the system. In some embodiments, in the first state, a first fluid path is defined by the valve feed inlet port that is in fluid communication with the valve feed outlet port, and a second fluid path is defined by the reject port that is in fluid communication with the tank squeeze port. In some embodiments, in the second state, a third fluid path is defined by the valve feed inlet port that is in fluid communication with the valve feed outlet port, and a fourth fluid path is defined by the tank squeeze port that is in fluid communication with the drain port. In some embodiments, in the third state, the valve feed inlet port is not in fluid communication with the valve feed outlet port.

In one or more embodiments, the valve is a hydraulic valve operated by water pressure of the system. In other embodiments, the valve is an electromechanical valve operated by a control system responding to pressure or flow sensors at various locations in the system.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A filtration system comprising:
   a water-on-water storage tank comprising a squeeze side and a product side separated by a membrane;
   a filter module in fluid communication with the water-on-water storage tank, a feed source, a product outlet, and a drain outlet;
   a feed line connecting the feed source to a feed inlet of the filter module;
   a product line connecting a filtrate outlet of the filter module to the product side of the storage tank and the product outlet; and
   a drain line connecting a reject outlet of the filter module to the squeeze side of the storage tank and the drain outlet of the system; and
   a shuttle valve comprising a piston body in a housing, the piston body having a first group of sections effective to block fluid flow and a second group of sections with reduced diameter to enable fluid flow, the piston having a first end connected to a spring and a second end having a piston face with an enlarged diameter relative to the first group of sections, the second end enclosed in a chamber, an inlet check valve located between a product line port and the chamber and an outlet check valve located between the product line port and the chamber, and a plurality of ports including a drain port connected to the drain outlet, a tank squeeze port connected to the squeeze side of the storage tank, a reject port connected to a reject outlet of the filter element, and the product line port connected to the product outlet and to the product side of the storage tank, and wherein pressure in the product line acting on the piston face determines the position of the piston body.

2. The filtration system of claim 1, wherein the piston body has at least three positions depending on the product line pressure on the piston face that moves the piston body, wherein:
   the first position enables flow from the feed source to the filter module and from the reject outlet of the filter module to the squeeze side of the storage tank when there is flow through the product outlet,
   the second position enables flow from the feed source to the filter module and from the squeeze side of the storage tank to the drain outlet of the system when there is not flow through the product outlet and the product side is not full, and
   the third position blocks flow from the feed source into the filtration system when the product side is full.

3. The filtration system of claim 1, wherein the filter module comprises a reverse osmosis filter.

4. The filtration system of claim 3, wherein the filter module comprises one or more pre-filters upstream of the reverse osmosis filter.

5. The filtration system of claim 3, wherein the filter module comprises a post-filter downstream from the product side of the storage tank.

6. The filtration system of claim 2, further comprising a flow control regulator that regulates flow from the reject outlet of the filter module to the drain outlet of the system when the valve is in the first state.

7. The filtration system of claim 2, further comprising a check valve located between the product side of the storage tank and the product line port to maintain a hold pressure during the third position.

8. A reverse osmosis water-on-water shuttle valve comprising:
- the shuttle valve comprising a piston body in a housing, the piston body having a first end connected to a spring and a second end having a piston face with an enlarged diameter relative to the piston body, the diameter of the piston face is greater than a maximum diameter of the remaining piston body, the second end enclosed in a chamber, an inlet check valve located between a product line port and the chamber and an outlet check valve located between the product line port and the chamber and an outlet check valve to the chamber;
- the shuttle valve having a valve feed inlet port, a valve feed outlet port, a drain port, a reject port, and a tank squeeze port, and the product port the piston body has at least three positions, wherein:
  - in the first position, a first fluid path is defined by the valve feed inlet port that is in fluid communication with the valve feed outlet port, and a second fluid path is defined by the reject port that is in fluid communication with the tank squeeze port;
  - in the second position, a third fluid path is defined by the valve feed inlet port that is in fluid communication with the valve feed outlet port, and a fourth fluid path is defined by the tank squeeze port that is in fluid communication with the drain port; and
  - in the third position, the valve feed inlet port is not in fluid communication with the valve feed outlet port.

9. The shuttle valve of claim 8, wherein the piston body comprises a plurality of sections, a first group of sections each independently having a first diameter effective to block flow from or to one or more of the following: the valve feed inlet port, the valve feed outlet port, the drain port, the reject port, and the tank squeeze port depending on the state of the shuttle valve, and a second group of sections each independently having a reduced diameter with respect to one or more of the first diameters, effective to permit flow from or to one or more of the following: the valve feed inlet port, the valve feed outlet port, the drain port, the reject port, and the tank squeeze port depending on the state of the shuttle valve.

10. The valve of claim 9, wherein the first group of sections are arranged in an alternating arrangement with the second group of sections.

11. The valve of claim 9, wherein the piston body further comprises a flow slot to allow fluid communication between the valve feed inlet port and the valve feed outlet port as the valve moves from the third position to the first position.

12. The valve of claim 8, further comprising a vent through the housing to allow air to be vented as the piston body moves between states.

13. The valve of claim 8, further comprising a plurality of sealing devices, which during the first position, are effective to separate the first fluid path from the second fluid path, and during the second position, are effective to separate the third fluid path from the fourth fluid path.

14. The valve of claim 1, wherein the inlet check valve has a cracking pressure greater than a cracking pressure of the outlet check valve.

15. A filtration system comprising:
- a water-on-water storage tank comprising a squeeze side and a product side separated by a membrane;
- a filter module connected to a feed source by a feed line, to a product outlet by a product line, and to a drain outlet by a drain line; and
- the valve of claim 8.

16. The filtration system of claim 15, wherein pressure of the product line determines the position of the piston body.

17. The filtration system of claim 15, further comprising a check valve in the product line to maintain a hold pressure on the valve during the third position.

18. The filtration system of claim 1 wherein the inlet check valve has a cracking pressure greater than a cracking pressure of the outlet check valve.

19. The filtration system of claim 7 wherein the check valve has a cracking pressure in the range from 0 to 0.5 psi, the inlet check valve has a cracking pressure in the range of 20 to 60 psi, and the outlet check valve has a cracking pressure in the range for 0 to 5 psi.

* * * * *